No. 702,718. Patented June 17, 1902.
J. H. FOX.
CARBONATOR FOR BEVERAGES.
(Application filed Oct. 17, 1901.)
(No Model.)
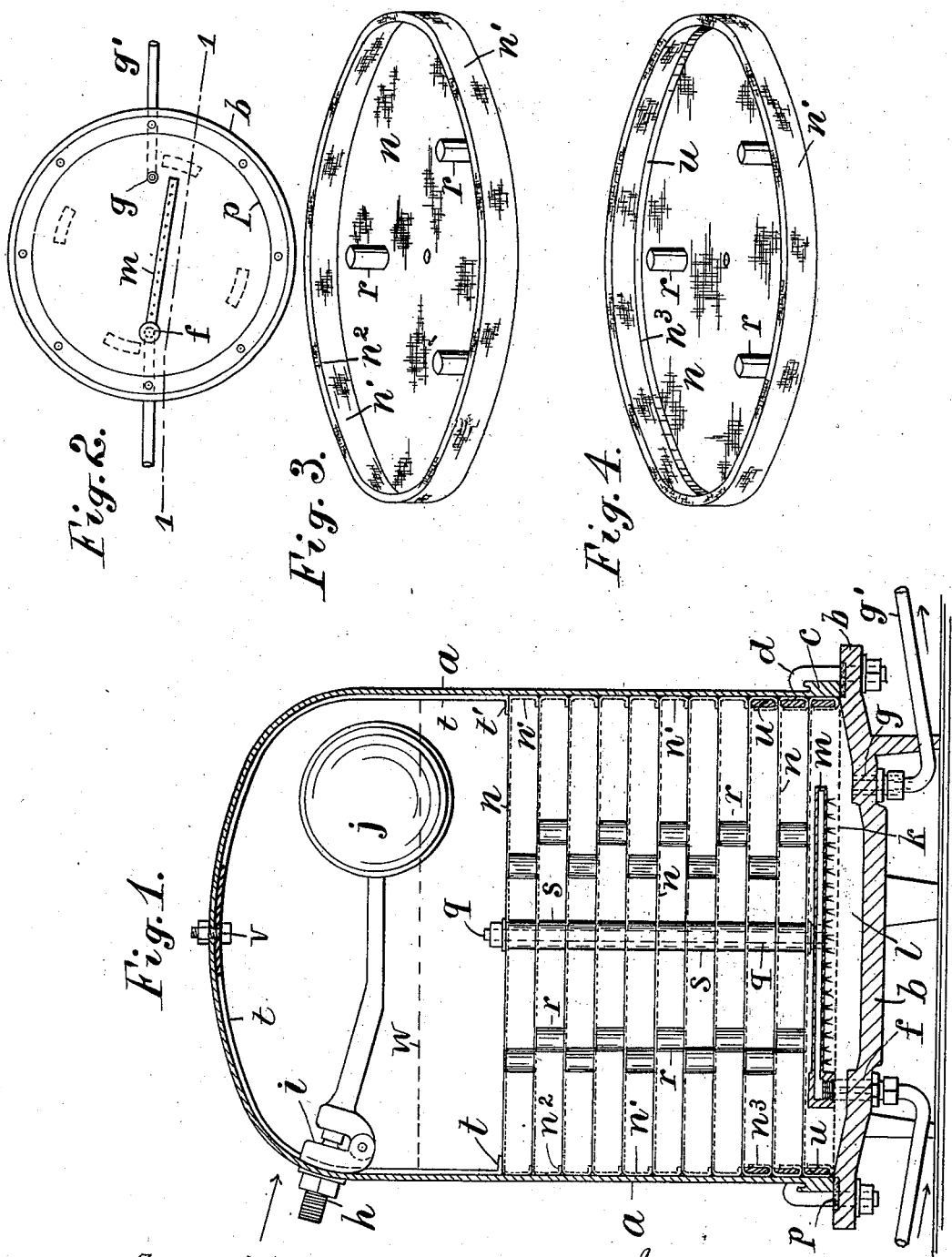
Attest:
L. Lew.
Walter H. Talmage.
Inventor.
John H. Fox, per
Thomas S. Crane, Atty.

UNITED STATES PATENT OFFICE.

JOHN H. FOX, OF NEW YORK, N. Y.

CARBONATOR FOR BEVERAGES.

SPECIFICATION forming part of Letters Patent No. 702,718, dated June 17, 1902.

Application filed October 17, 1901. Serial No. 79,031. (No model.)

*To all whom it may concern:*

Be it known that I, JOHN H. FOX, a citizen of the United States, residing at 234 East Thirty-third street, New York, county of New York, State of New York, have invented certain new and useful Improvements in Carbonators for Beverages, fully described and represented in the following specification and the accompanying drawings, forming a part of the same.

The object of this invention is to furnish an apparatus for making carbonated or aerated liquids and which shall be cheap in its construction and efficient in its operation.

The apparatus may be used to impregnate water and other liquids with carbonic-acid gas under pressure and is especially adapted to permit the cleaning of the shell and the perforated disks which serve to disseminate the gas through the water.

The invention will be understood by reference to the annexed drawings, in which—

Figure 1 is a vertical section of the apparatus on line 1 1 in Fig. 2. Fig. 2 is a plan of the bottom upon a reduced scale. Fig. 3 is a perspective view of one of the perforated disks with flanged edge, and Fig. 4 is a similar view of one of the disks with a hoop fitted inside the flange. Figs. 3 and 4 show the disk inverted.

$a$ designates the shell or casing of the vessel which contains the gas and water chamber and which is shown connected with the bottom $b$ by means of a locking-ring $c$, secured to the bottom of the shell, and removable hooked bolts $d$, inserted through the bottom. Such construction is common and operates to form a tight joint between the shell and the bottom in connection with an annular packing $p$, applied to the bottom. A gas-inlet nozzle $f$ is inserted in the bottom, near one side thereof, and a water-outlet nozzle $g$ is inserted through the bottom near the opposite side. A water-inlet nozzle $h$ is inserted in the casing near the top and provided with an automatic valve $i$, which is actuated by a ball-float $j$ to maintain the desired water-level $w$ in the apparatus.

The bottom $b$ is dished, and a perforated grating $k$ is inserted within the casing, resting upon the bottom and forming a chamber $l$ between the grating and bottom, which chamber connects with the nozzle $g$. A pipe $g'$ serves to draw the carbonated water from the nozzle $g$, such water passing through the grating to reach the nozzle. The gas-nozzle $f$ is not connected with the chamber $l$; but a gas-pipe $m$ is connected through the grating with the nozzle $f$ and is extended horizontally just above the surface of the grating and provided upon its lower side with holes which direct jets of gas downwardly upon and through the grating. The end of the pipe is closed, so that the gas is delivered only from the jet-holes. The pipe $m$ is formed with a socket which screws upon the nozzle $f$, so that it can be readily removed when it is desired to separate the grating from the bottom.

A series of eleven perforated screens or disks $n$ is shown fitted horizontally within the casing and each formed upon the edge with a downwardly-turned flange $n'$, which operates to space the disks apart and to support the bottom one upon the grating $k$. The disks are connected centrally by a bolt $q$, having nuts at its opposite ends, the one at the lower end lying in the space between the bottom disk and the grating $k$. Bushings $s$ are threaded upon the bolt between the disks to space them apart at the center and sustain the clamping pressure of the nuts. The disks are also supported and spaced apart by a spaced series of studs or blocks $r$, three of such blocks, arranged equidistantly at a common distance from the bolt, being shown in Figs. 3 and 4. The studs or blocks are soldered to the disks. The disks are preferably made of wire-cloth with fine mesh adapted to intimately subdivide the gas in its natural movement upward through the water in the vessel, and such wire-cloth possesses inherently very little strength; but the bending of the disks into annular flanges at the edges and the provision of the bushings $s$ and studs $r$ to space the disks apart give the disks sufficient stiffness and support.

A shoulder $t'$, shown formed by a strap $t$, is provided within the shell $a$ at the top of the series of disks, and serves, when the shell is secured upon the bottom $b$, to hold the group of disks firmly together in the required position. The lowest three of the disks are each shown with flanges $n^3$, reflexed around a metal hoop $u$, which serves to greatly stiffen the edges of the disks and permits their handling in the process of manufacture and in assembling the parts together to form the carbonator. The flanges upon the other disks are not only bent downwardly at $n'$, but also inwardly at $n^2$ upon the bottom edge to form a bearing-surface where each flange rests upon the top of the disk below. The depths of all the flanges, studs $r$, and bushings $s$ are uniform, so that the disks when assembled together are all supported parallel with one another.

When the shell $a$ is released from the bottom by removing the bolts $d$, the shell can be raised, leaving the series of disks resting upon the bottom, and the disks can then be readily moved and separated for cleaning independently. The interior of the shell can also be cleaned and also the bottom by unscrewing the jet-pipe $m$ from the nozzle $f$ and lifting the grating $k$ from the bottom, and every part of the interior is thus readily reached for cleansing when required.

The lower grating $k$ may be made of coarser mesh than the disks $n$ and may therefore be made of perforated sheet or cast metal. On account of the fineness of the scale the perforations cannot readily be shown in the drawing; but to show the difference between the grating and the disks the disks are represented each with a single solid line and a fine dotted line beneath it, while the grating is represented with a single coarse dotted line.

All the internal parts of the apparatus are made of or coated with block-tin, the casing $a$ and bottom $b$ being lined with block-tin, the bushings $s$, pipe $m$, and studs $r$ formed of block-tin, the screens $n$ plated with tin, and the bolt $q$ and all of the parts of the valve $i$ and float $j$ similarly protected.

To form the shoulder within the casing to hold the screens in place, a flat iron strap $t$, coated with tin, is bent to fit inside the upper part of the casing and formed with elbows $t'$ upon its ends to contact with the upper screen. A single bolt $v$ in the top of the casing suffices to hold such strap in place. Such means of forming the shoulder is employed to avoid penetrating the block-tin lining of the casing below the water-line $w$. If desired, the bolt can be extended through the grating $k$ and tapped into the bottom $b$; but the construction shown permits the screens $n$ to be separated most readily for cleansing when the casing is removed.

Operation of the apparatus: The gas introduced through the pipe $m$ is discharged downwardly to distribute it beneath the bottom screen $n$, through which it rises and passes upward gradually through the other screens, mingling with the layers of water between the several screens and being thus absorbed rapidly by the liquid. When the charge of water is carbonated, the liquid may be drawn gradually from the pipe $g'$ and fresh water supplied through the valve $i$. The gas in such case continues to rise through the screens and carbonates the water as it flows downwardly toward the outlet. The grating $k$ is provided below the pipe $m$ to prevent the gas from passing too readily to the outlet-pipe $g'$ when the carbonated water is being drawn from the apparatus.

Having thus set forth the nature of the invention, what is claimed herein is—

1. In a carbonator, the combination, with the shell $a$ having water-inlet at the top, and provided with removable bottom having gas-inlet and water-outlet, of the series of perforated disks $n$ each having its edge flanged and connected to a hoop $u$ to strengthen the same, and the central rod and bushings to secure the disks together, substantially as herein set forth.

2. In a carbonator, the combination, with the shell $a$ having water-inlet at the top, and provided with removable bottom having gas-inlet and water-outlet, of the series of perforated disks $n$ having the flanges $n'$ at the edges to space them apart, a spaced series of studs $r$ soldered to each of the disks, and the bolt connecting the disks and having the bushings $s$ fitted between the same, substantially as herein set forth.

3. In a carbonator, the combination, with the shell $a$ having water-inlet at the top, and provided with removable bottom having gas-inlet and water-outlet, of the series of perforated disks $n$ flanged at the edges to space them apart, and the stop $t'$ upon the shell $a$ to contact with the upper disk and hold the series in place, substantially as herein set forth.

4. In a carbonator, the combination, with the shell $a$ having water-inlet at the top and provided with removable bottom having gas-inlet and water-outlet and having a perforated grating secured just above the bottom, of the series of perforated disks $n$ having the flanges $n'$ at the edges to space them apart, the flange of the bottom disk resting upon the grating as set forth, and the bolt $q$ connecting the disks and having the bushings $s$ fitted between the same, and the nut for the bolt sustained above the grating by the flange of the bottom disk.

5. In a carbonator, the combination, with the shell $a$ having water-inlet at the top, of the removable dished bottom having gas-inlet and water-outlet and provided with the perforated grating $k$ forming chamber $l$ next above the gas-inlet and water-outlet, and the series of perforated disks $n$ having the flanges $n'$ at the edges to space them apart, with bolt $q$ and bushings $s$ connecting the disks, and the flange of the bottom disk resting upon the grating, as set forth.

6. In a carbonator, the combination, with the shell $a$ having water-inlet at the top and provided with removable bottom having gas-inlet and water-outlet and having a perforated grating secured just above the bottom, of the series of perforated disks $n$ having the flanges $n'$ at the edges to space them apart, and the bolt $q$ to secure them together, and the gas-inlet pipe $f$ extended from the bottom between the grating and the bottom disk and perforated to project the gas downwardly in the grating, as and for the purpose set forth.

7. In a carbonator, the combination, with the shell $a$ having water-inlet at the top and provided with removable bottom having gas-inlet and water-outlet, with the series of perforated disks $n$ having flanges $n'$ at the edges to space them apart, of the strap $t$ secured within the top of the casing by the bolt $v$ with its ends extended downward to the upper screen to hold the screens in place.

In testimony whereof I have hereunto set my hand in the presence of two subscribing witnesses.

JOHN H. FOX.

Witnesses:
 THOMAS S. CRANE,
 L. LEE.